(12) United States Patent
Kawata et al.

(10) Patent No.: US 10,811,850 B2
(45) Date of Patent: Oct. 20, 2020

(54) SPARK PLUG OF INTERNAL COMBUSTION ENGINE

(71) Applicant: DENSO CORPORATION, Kariya, Aichi-pref (JP)

(72) Inventors: Yuuki Kawata, Nisshin (JP); Fumiaki Aoki, Nisshin (JP); Daisuke Tanaka, Nisshin (JP); Ryota Wakasugi, Nisshin (JP); Kanechiyo Terada, Kariya (JP); Tetsuya Miwa, Kariya (JP); Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/582,430

(22) Filed: Sep. 25, 2019

(65) Prior Publication Data

US 2020/0099198 A1    Mar. 26, 2020

(30) Foreign Application Priority Data

Sep. 26, 2018   (JP) .................................. 2018-180551

(51) Int. Cl.
*H01T 13/06*       (2006.01)
*H01T 13/20*       (2006.01)

(52) U.S. Cl.
CPC ............. *H01T 13/06* (2013.01); *H01T 13/20* (2013.01)

(58) Field of Classification Search
CPC ...................................................... H01T 13/06
See application file for complete search history.

(56) References Cited

U.S. PATENT DOCUMENTS

| 5,069,178 A | 12/1991 | Kawamura |
| 2015/0194793 A1* | 7/2015 | Yamanaka ............... H01T 13/32 313/141 |
| 2016/0197585 A1 | 7/2016 | Oku |
| 2017/0358905 A1 | 12/2017 | Kasahara et al. |

FOREIGN PATENT DOCUMENTS

| JP | S64-024155 | 1/1989 |
| JP | H04-259651 | 9/1992 |
| JP | H06-159063 | 6/1994 |
| JP | H06-280628 | 10/1994 |
| JP | H08-270471 | 10/1996 |
| JP | 2002-317664 | 10/2002 |
| JP | 2013-185515 | 9/2013 |
| JP | 2016-197585 | 11/2016 |
| JP | 2017-228394 | 12/2017 |
| JP | 2018-006304 | 1/2018 |

* cited by examiner

*Primary Examiner* — Joseph L Williams
*Assistant Examiner* — Jacob R Stern
(74) *Attorney, Agent, or Firm* — Nixon & Vanderhye P.C.

(57) ABSTRACT

In a spark plug for an internal combustion engine, a discharge gap is formed between a central electrode and a ground electrode in an axial direction of the spark plug. An insulator of a cylindrical shape has an axial hole and an insulator front end part. The axial hole is formed in the insulator, into which the central electrode is arranged and supported. The insulator front end part projects further toward a front side of the insulator in the axial direction of the spark plug than a location of an opening part formed at a front end side of the axial hole. The discharge gasp is formed in an auxiliary combustion chamber. The outer peripheral side of the auxiliary combustion chamber is covered with the insulator front end part.

13 Claims, 17 Drawing Sheets

SPARK PLUG OF INTERNAL COMBUSTION ENGINE

CROSS-REFERENCE TO RELATED APPLICATION

This application is related to and claims priority from Japanese Patent Application No. 2018-180551 filed on Sep. 26, 2018, the contents of which are hereby incorporated by reference.

TECHNICAL FIELD

The present disclosure relates to spark plugs of internal combustion engines.

BACKGROUND

Spark plugs are widely used as ignition means for delivering electric current from an ignition system to a combustion chamber of an internal combustion engine, a cogeneration system, etc. to ignite a compressed fuel/air mixture by an electric spark.

Patent document 1, Japanese laid open publication No. 2018-06304 discloses a spark plug having a structure in which a discharge gap is covered with a plug cover so as to form an auxiliary combustion chamber inside the plug cover. An electrical spark is generated in the discharge gap of the spark plug.

In the spark plug having the structure previously described, a compressed fuel/air mixture in a combustion chamber of the internal combustion engine is also supplied to the auxiliary combustion chamber through an injection hole formed in the plug cover. After this, an electrical spark is generated in the discharge gap so as to ignite the compressed fuel/air mixture in the auxiliary combustion chamber. This generates a flame jet and supplies the generated flame jet into the combustion chamber of the internal combustion engine through the injection hole formed in the plug cover.

However, in the structure of the spark plug disclosed in patent document 1, metal members, for example, the plug cover and a housing which form the auxiliary combustion chamber absorbs thermal energy of a flame when the flame is generated in the auxiliary combustion chamber. This phenomenon inhibits generation of the flame jet. Accordingly, there is a demand of improving the structure of the spark plug in view of ignitability by the spark plug.

SUMMARY

It is desired for the present disclosure to provide a spark plug having a central electrode, a ground electrode, an insulator, and an auxiliary combustion chamber. A discharge gap is formed between the central electrode and the ground electrode in an axial direction of the spark plug. The insulator has a cylindrical shape. The insulator has an axial hole and an insulator front end part. The axial hole is formed in the insulator, into which the central electrode is arranged and supported. The insulator front end part projects toward a front side of the insulator in the axial direction of the spark plug than an opening part formed at a front end side of the axial hole. The discharge gap is arranged in the auxiliary combustion chamber. The insulator front end part covers the auxiliary combustion chamber from an outer radial side of the auxiliary combustion chamber.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
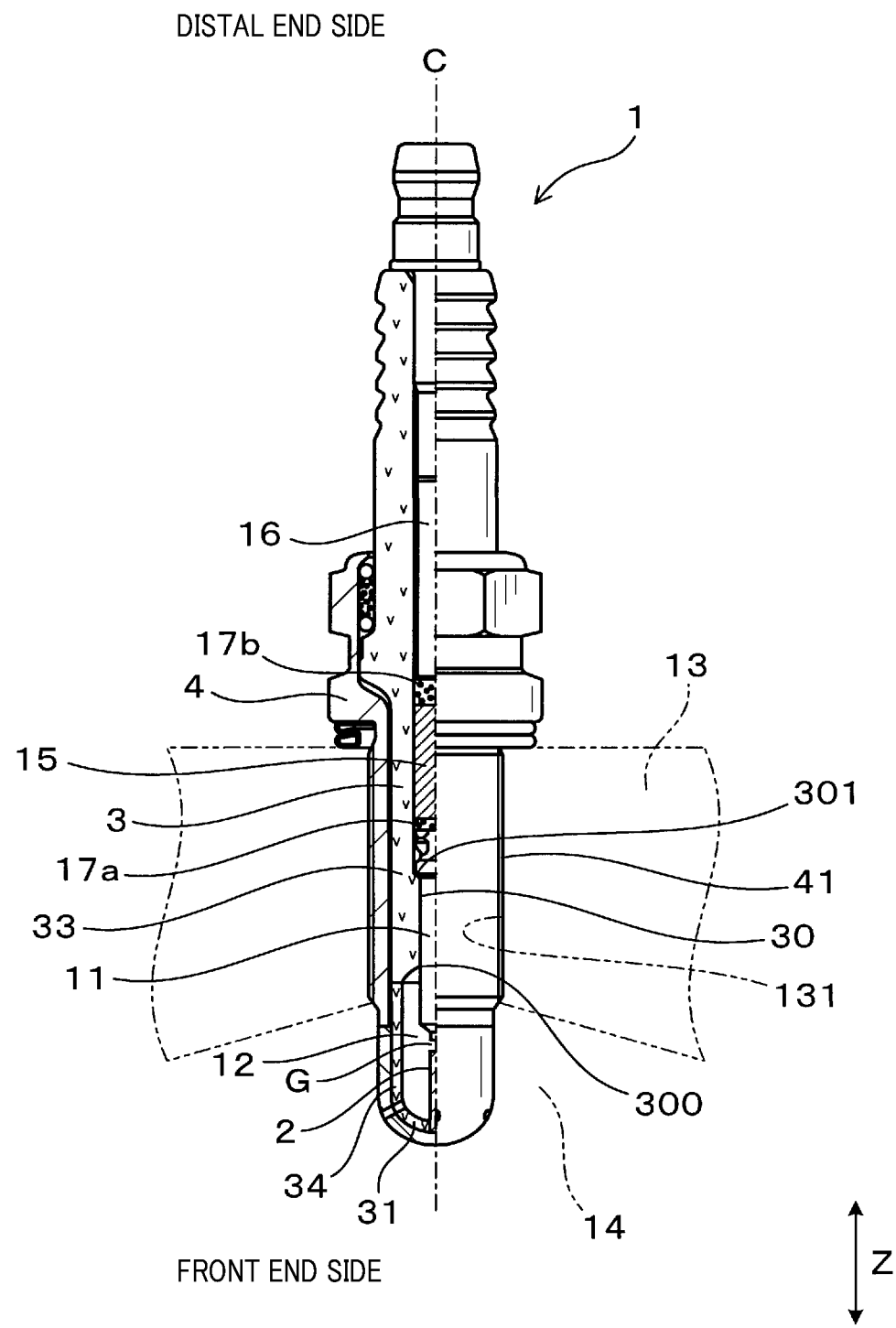
FIG. 1 is a front view showing a partial cross section of a spark plug according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of the spark plug according to the first exemplary embodiment of the present disclosure with reference to FIG. 1 to FIG. 3.

FIG. 1 is a front view showing a partial cross section of the spark plug 1 according to the first exemplary embodiment of the present disclosure.

As shown in FIG. 1, the spark plug 1 according to the first exemplary embodiment has a central electrode 11, a ground electrode 2 and an insulator 3, an auxiliary combustion chamber 12. The ground electrode 2 and the central electrode 11 form a discharge gap G. In other words, the discharge gap G is formed between the ground electrode 2 and the central electrode 11.

The insulator 3 has an axial hole 30. The central electrode 11 is supported inside the axial hole 30. The insulator 3 has a cylindrical shape. The discharge gap G is formed at the inside of the auxiliary combustion chamber 12.

The insulator 3 has an insulator front end part 31 which projects toward the front end side of an opening part 300 formed at the front end side of the axial hole 30.

The insulator front end part 31 of the insulator 3 is formed to cover the auxiliary combustion chamber 12 from the outer radial side of the auxiliary combustion chamber 12.

The spark plug 1 is used as ignition means for delivering electric current from an ignition system to a combustion chamber of an internal combustion engine (not shown) to ignite a compressed fuel/air mixture by an electric spark. For example, it is possible to mount the spark plug 1 on motor vehicles, cogeneration systems, etc.

In a axial direction Z of the spark plug 1, one end of the spark plug 1 is electrically connected to an ignition coil (not shown), and the other end of the spark plug 1 is arranged inside a combustion chamber 14 of an internal combustion engine.

Through the description of the first exemplary embodiment, the axial direction X of the spark plug 1 is in parallel with the central axis C of the spark plug 1. The connection node between the spark plug 1 and the ignition coil (not shown) is arranged at a distal end side of the spark plug 1. The spark plug 1 is arranged in the combustion chamber 14 at the front end side of the spark plug 1. A radial direction of the spark plug 1 is perpendicular to the axial direction Z of the spark plug 1.

The insulator 3 has a cylindrical shape made of alumina, for example. That is, the insulator 3 has a rotating body rotating around the central axis C of the spark plug 1. The axial hole 30 is formed at the center part of the spark plug 1 and the axial hole 30 extends toward the axial direction Z of the spark plug 1. As shown in FIG. 1, the axial hole 30 is open at both ends thereof along the axial direction Z. An inner diameter at the front end side of the axial hole 30 is smaller than an inner diameter at the distal end side of the axial hole 30. The central electrode 11 is supported by a step part 301 of the insulator 3.

Figure 2:
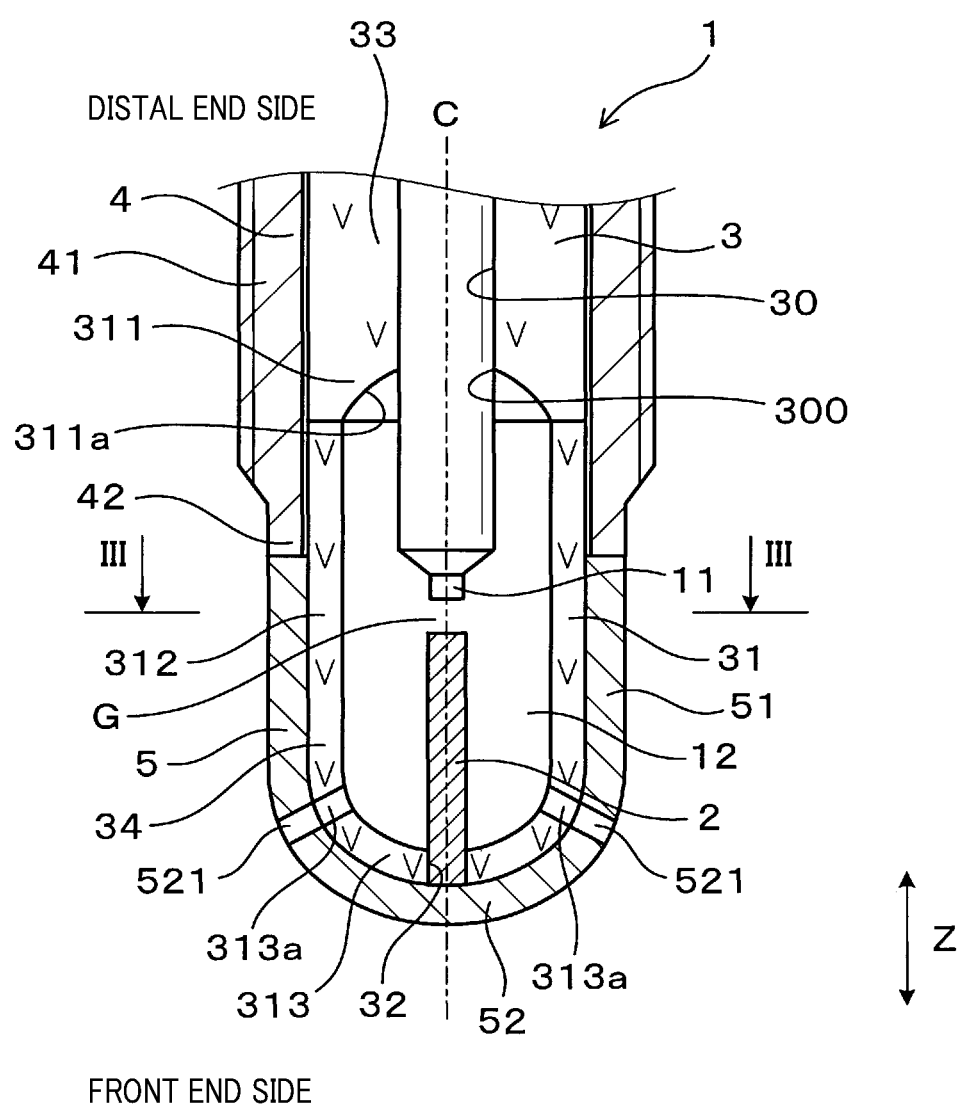
FIG. 2 is a view showing an enlarged cross section around a front end part of the spark plug according to the first exemplary embodiment shown in FIG. 1.

FIG. 2 is a view showing an enlarged cross section around the front end part of the spark plug 1 according to the first exemplary embodiment shown in FIG. 1. As shown in FIG. 1 and FIG. 2, the insulator 3 has an insulator front end part 31 which projects to the front end side of the opening part 300 formed at the front end side of the axial hole 30.

As shown in FIG. 2, the insulator front end part 31 is formed up to a front side of the discharge gap G. That is, the insulator front end part 31 surrounds the discharge gap G from the outer radial side of the discharge gap G. In other words, the discharge gap G is surrounded by the insulator front end part 31. The insulator front end part 31 is formed around the auxiliary combustion chamber 12 and the front end side of the insulator front end part 31 is closed. In other words, as shown in FIG. 1 and FIG. 2, the insulator front end part 31 of the insulator 3 surrounds the overall auxiliary combustion chamber 12. The auxiliary combustion chamber 12 is covered with the insulator front end part 31 arranged at the front end side of the spark plug 1. In other words, the inside of the insulator front end part 31 forms the auxiliary combustion chamber 12.

The auxiliary combustion chamber 12 is separated from the combustion chamber 14. As shown in FIG. 2, the auxiliary combustion chamber 12 surrounds the discharge gap G. The auxiliary combustion chamber 12 communicates with the combustion chamber 14 located at the outside of the spark plug 1 through a plurality of cover injection holes 521 and a plurality of insulation injection holes 313a (which will be explained later).

The insulator front end part 31 is formed to cover the interior surface of the spark plug housing 4 (which will be explained later) and the interior surface of the plug cover 5. The spark plug housing 4 and the plug cover 5 are arranged not facing the auxiliary combustion chamber 12.

As shown in FIG. 2, the insulator front end part 31 has a first part 311, a second part 312 and a third part 313 which are arranged in order viewed from the distal end side of the insulator front end part 31.

The first part 311 is formed at the distal end side of the insulator front end part 31. The first part 311 has a structure in which an inner peripheral surface 311a thereof extends outwardly to the outer radial side of the first part 311. The inner peripheral surface 311a of the first part 311 is curved toward the outer radial side of the first part 311.

As shown in FIG. 1 and FIG. 2, the second part 312 of the insulator front end part 31 has a cylindrical shape along the axial direction Z. As shown in FIG. 2, the discharge gap G is arranged substantially at the middle part of the second part 312 in the axial direction Z of the spark plug 1. The front part of the second part 312 is located further towards the front end side of the spark plug than the discharge gap G.

As shown in FIG. 2, the third part 313 of the insulator front end part 31 is arranged to cover the front part of the second part 312. The third part 313 has a hemispherical shape expending toward the front end side of the spark plug 1. A plurality of insulator injection holes 313a are formed in the third part 313.

Figure 3:
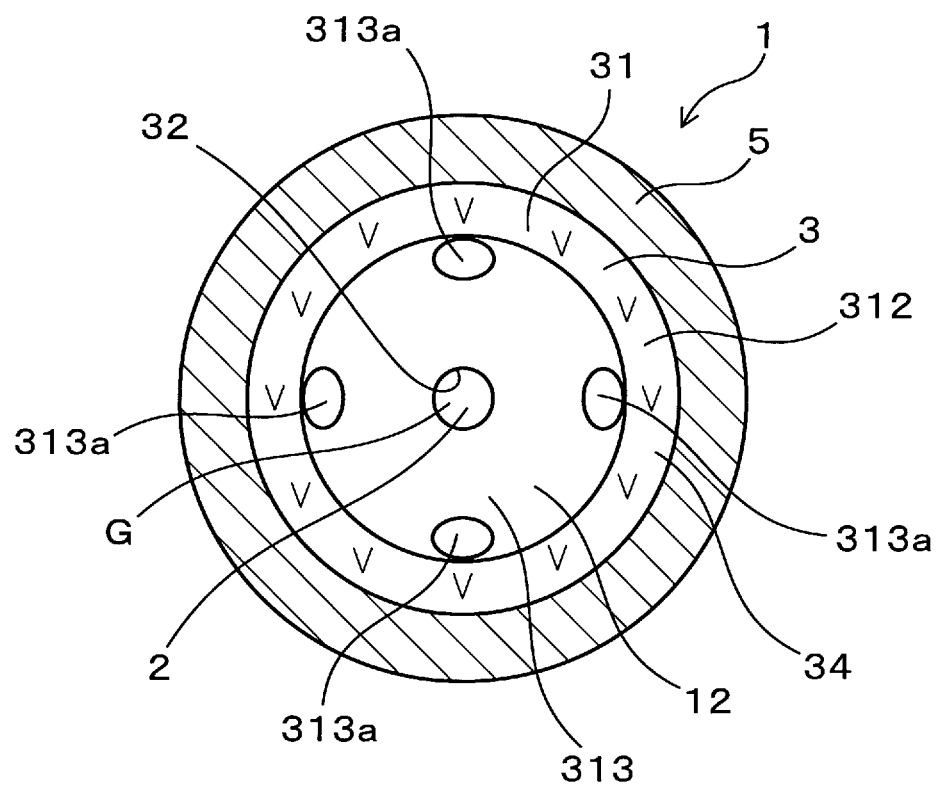
FIG. 3 is a view showing a cross section of the spark plug along the line III-III shown in FIG. 2.

FIG. 3 is a view showing a cross section of the spark plug 1 along the line III-III shown in FIG. 2. As shown in FIG. 3, the plurality of insulator injection holes 313a are arranged at regular intervals in a circumferential direction of the insulator front end part 31. As shown in FIG. 2, each of the insulator injection holes 313a is arranged toward the outer radial side of the insulator front end part 31 along the front end side of the spark plug 1.

As shown in FIG. 2, the insulator 3 is composed of an insulator body 33, an insulator cover 34 and the insulator front end part 31. The insulator cover 34 is assembled with the insulator body 33 together.

The insulator body 33 is formed by the front end to the distal end of the first part 311 of the insulator front end part 31. The insulator cover 34 is formed by the second part 312 and the third part 313 of the insulator front end part 31.

The insulator body 33 and the insulator cover 34 are arranged so that the front end part of the first part 311 of the insulator body 33 is joined with the distal end part of the second part 312 of the insulator cover 34.

In the structure in which the spark plug housing 4 and the plug cover 5 are assembled with the insulator 3 together, the inner surface of the plug cover 5 is covered with the insulator cover 34, and the insulator cover 34 is positioned by the plug cover 5. It is also acceptable to join a butt joint part of the insulator body 33 and a butt joint part of the insulator cover 34 together by using an adhesive so as to fix them together.

The spark plug housing 4 has a cylindrical shape. The insulator 3 is supported inside the spark plug housing 4 so that the distal end part of the insulator 3 projects from the spark plug housing 4 and the front end part of the insulator also projects from the spark plug housing 4.

As shown in FIG. 1 and FIG. 2, the spark plug housing 4 has a mounting screw part 41 formed at the outer peripheral part of the spark plug housing 4. As shown in FIG. 1, the mounting screw part 41 of the spark plug housing 4 of the spark plug 1 is screwed with a female screw hole 131 formed in the cylinder head 13 of the internal combustion engine (not shown) so as to fix the spark plug 1 to the cylinder head 13.

In the situation in which the spark plug 1 is mounted to the cylinder head 13 of the internal combustion engine, the front end part of the spark plug 1 is exposed to fuel mixture gas introduced inside the combustion chamber 14 of the internal combustion engine.

As shown in FIG. 2, a housing front end part 42 is formed at the front end side of the spark plug housing 4, which is located at a front side of the mounting screw part 41. The housing front end part 42 has a cylindrical shape projecting toward the front end side of the spark plug 1.

The housing front end part 42 is located further towards the distal end side of the spark plug than the location of the discharge gap G, in the axial direction Z. The inner peripheral surface of the mounting screw part 41, and the inner peripheral surface of the housing front end part 42 are formed to fit with the outer peripheral surface of the insulator 3. The inner peripheral surface of the mounting screw part 41 and the inner peripheral surface of the housing front end part 42 face the outer peripheral surface of the insulator 3 with a small gap. The housing front end part 42 is connected to the plug cover 5.

As shown in FIG. 2, the plug cover 5 is formed along the outer surface of the insulator cover 34 of the insulator front end part 31. In other words, the inner surface of the plug cover 5 is covered with the insulator cover 34 of the insulator front end part 31.

The plug cover 5 has a cup shape in which the front end part of the plug cover 5 is closed, and the distal end side of the plug cover 5 is open. The plug cover 5 has a circular shape around the central axis C of the spark plug 1.

As shown in FIG. 2, the plug cover 5 has a cylindrical part 51 and a hemispherical part 52. The cylindrical part 51 has a cylindrical shape parallel to the axial direction Z and is extended toward the front end side from the mounting screw part 41.

The cylindrical part 51 is formed along the outer peripheral surface of the second part 321 of the insulator front end part 31. The hemispherical part 52 is formed along the outer circumferential surface of the third part 313 of the insulator front end part 31. The hemispherical part 52 has a hemispherical shape extending or projecting toward the front end side.

The distal end part of the cylindrical part 51 of the plug cover 5 is joined to the housing front end part 42 of the spark plug housing 4 by welding, etc.

As shown in FIG. 2, a maximum thickness of a part of the third part 313 of the insulator front end part 31 (i.e. a part of the second part 312 and the third part 313), which faces the plug cover 5, is less than a thickness of the plug cover 5. A maximum thickness of a part of the insulator front end part 31, which faces the plug cover 5, is less than the thickness of the plug cover 5. This structure makes it possible to reduce a thermal capacity of the insulator front end part 31.

As shown in FIG. 2, the plug cover 5 has the plurality of cover injection holes 521, through which the inside of the plug cover 5 communicates with the outside of the spark plug 1. Each of the cover injection holes 521 communicates with the respective insulation injection holes 313*a*. The overall cover injection holes 521 are formed to communicate with the outside of the respective insulation injection holes 313*a*.

Each of the cover injection holes 521 aliens in a straight line with the central axis of the respective insulation injection hole 313*a*. On a cross sectional surface, which is perpendicular to the central axis of each insulation injection hole 313*a*, the cover injection holes 521 and the insulation injection holes 313*a* have the same shape.

The ground electrode 2 is formed standing toward the distal end part of the spark plug 1 from the inside surface of the plug cover 5.

As shown in FIG. 2 and FIG. 3, the ground electrode 2 is formed standing at the central part of the plug cover 5 viewed from the front end side of the spark plug 1 in the axial direction Z. The ground electrode 2 has a cylindrical shape formed in the axial direction Z so that a central axis of the ground electrode 2 is equal to the central axis C of the spark plug 1. It is acceptable to form the ground electrode 2 having another shape instead of a cylindrical shape.

As shown in FIG. 2 and FIG. 3, the ground electrode 2 is inserted into an electrode mounting hole 32 formed in the third part 313 of the insulator front end part 31 of the insulator 3. Further, the front part of the ground electrode 2 is joined to the plug cover 5.

For example, the spark plug housing 4 and the plug cover 5 are made of an electrically conductive material having thermal conductivity such as iron, nickel, nickel iron alloy, stainless, etc. The ground electrode 2 is electrically conducted to the spark plug housing 4 through the plug cover 5. The ground electrode 2 faces the central electrode 11 through the discharge gap G in the axial direction X of the spark plug 1.

As shown in FIG. 1, the front end part of the central electrode 11 is exposed outside of the insulator 3, and the central electrode 11 is inserted into and supported by the axial hole 30 formed at the center part of the spark plug 1.

The central axis of the central electrode 11 is equal to the central axis C of the spark plug 1. The discharge gap G is formed between the front end surface of the central electrode 11 and the distal end surface of the ground electrode 2.

As shown in FIG. 1, a resistor 15 is arranged through a conductive glass seal 17*a* at the distal end side of the central electrode 11 arranged in the axial hole 30.

The resistor 15 is formed by thermally sealing a resist composition containing carbon powder or ceramic powder resistance materials, for example, and glass powder in the axial hole 30.

It is also acceptable to insert a cartridge type resistor in the axial hole 30. The conductive glass seal 17*a* is made of copper glass obtained by mixing glass and copper powder together.

A terminal metal fitting 16 is arranged at the distal end side of the resistor 15 through a glass seal 17*b* made of copper glass, like the glass seal 17*a*. The terminal metal fitting 16 is made of iron alloy, for example. The distal end part of the terminal metal fitting 16 is exposed outside from the axial hole 30. The spark plug 1 is electrically connected to an ignition coil (not shown) through the terminal metal fitting 16.

In the spark plug 1 having the structure previously described, a fuel mixture in the combustion chamber 14 of the internal combustion engine (not shown) is introduced into the auxiliary combustion chamber 12 through the cover injection holes 521 and the insulation injection holes 313a. The introduced fuel mixture is ignited to generate a flame in the auxiliary combustion chamber 12 when s spark discharge is generated in the discharge gap G. The flame generated in the auxiliary combustion chamber 12 is grown to generate a flame jet. The flame jet is injected into the combustion chamber 14, located outside of the auxiliary combustion chamber 12, through the cover injection holes 521 and the insulation injection holes 313a.

The flame jet is expanded in the overall combustion chamber 14, and a fuel mixture in the combustion chamber 14 is thereby ignited. The speak plug 1 ignites a fuel mixture in the combustion chamber 14 and a combustion occurs in the combustion chamber 14.

A description will be given of a method of producing the spark plug 1 according to the first exemplary embodiment with reference to FIG. 4 and FIG. 5.

Figure 4:
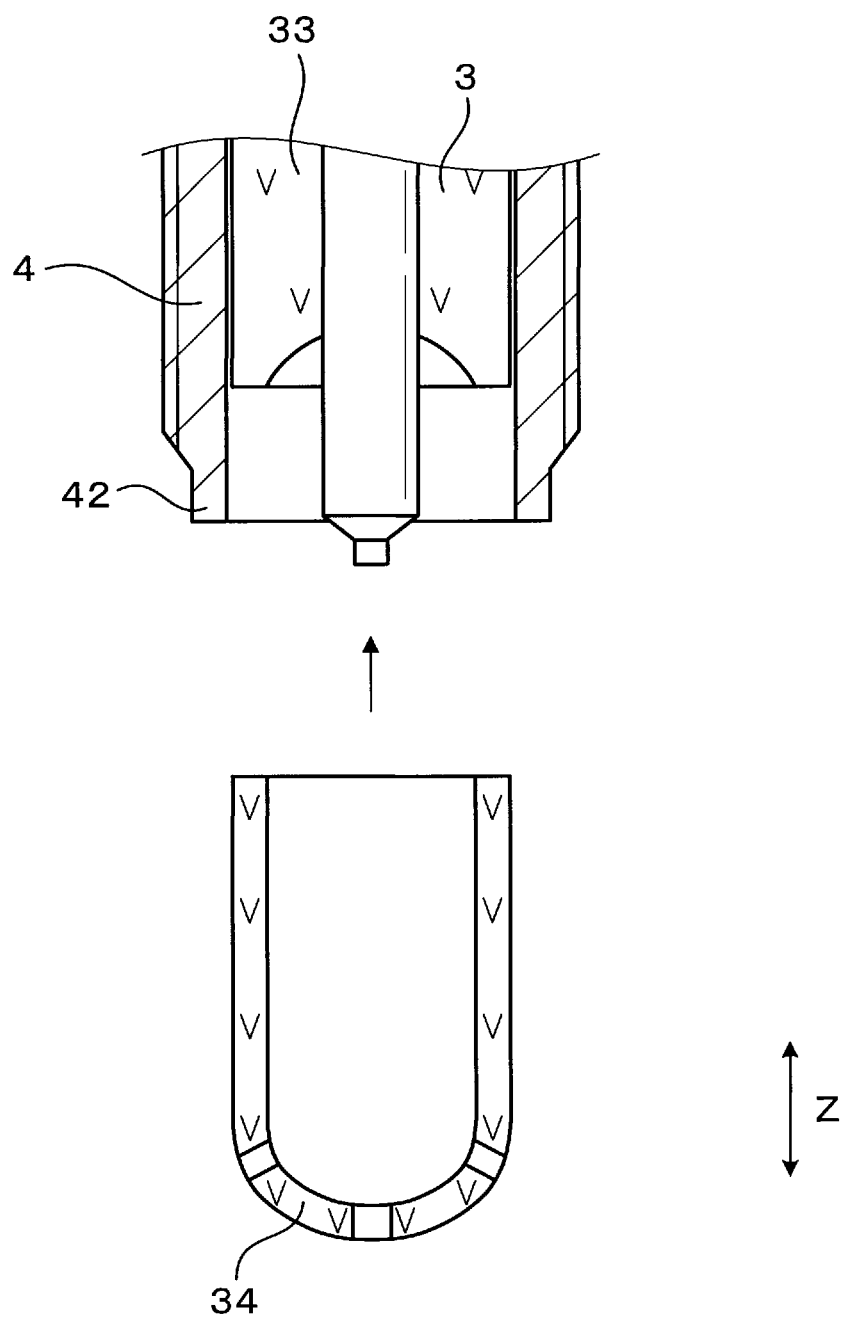
FIG. 4 is a view showing a cross section explaining a step of assembling an insulator body supported by a spark plug housing with an insulator cover together in the spark plug according to the first exemplary embodiment.

FIG. 4 is a view showing a cross section explaining a step of assembling the insulator body 33 supported by the spark plug housing 4 with the insulator cover 34 together in the spark plug 1 according to the first exemplary embodiment. FIG. 5 is a view showing a cross section explaining a step of assembling the spark plug housing 4 and the insulator 3 supported by the spark plug housing 4 with the plug cover 5 and the ground electrode 2 in the spark plug 1 according to the first exemplary embodiment.

As shown in FIG. 4, the insulator body 33 in the insulator 3 is supported by the spark plug housing 4. As shown in FIG. 4 and FIG. 5, the insulator cover 34 is inserted into the inside of the spark plug housing 4 from the distal end part (which is open) of the spark plug housing 4. The insulator cover 34 and the insulator body 33 are assembled together. In this assembling step, the insulator cover 34 is inserted to the inside of the spark plug housing 4 while the inner peripheral surface of the spark plug housing 4 is fitted with the outer peripheral surface of the insulator cover 34. This allows the insulator cover 34 to face the insulator body 33 of the insulator 3. It is acceptable to join the insulator body 33 and the insulator cover 34 by using an adhesive or by welding, etc.

Figure 5:
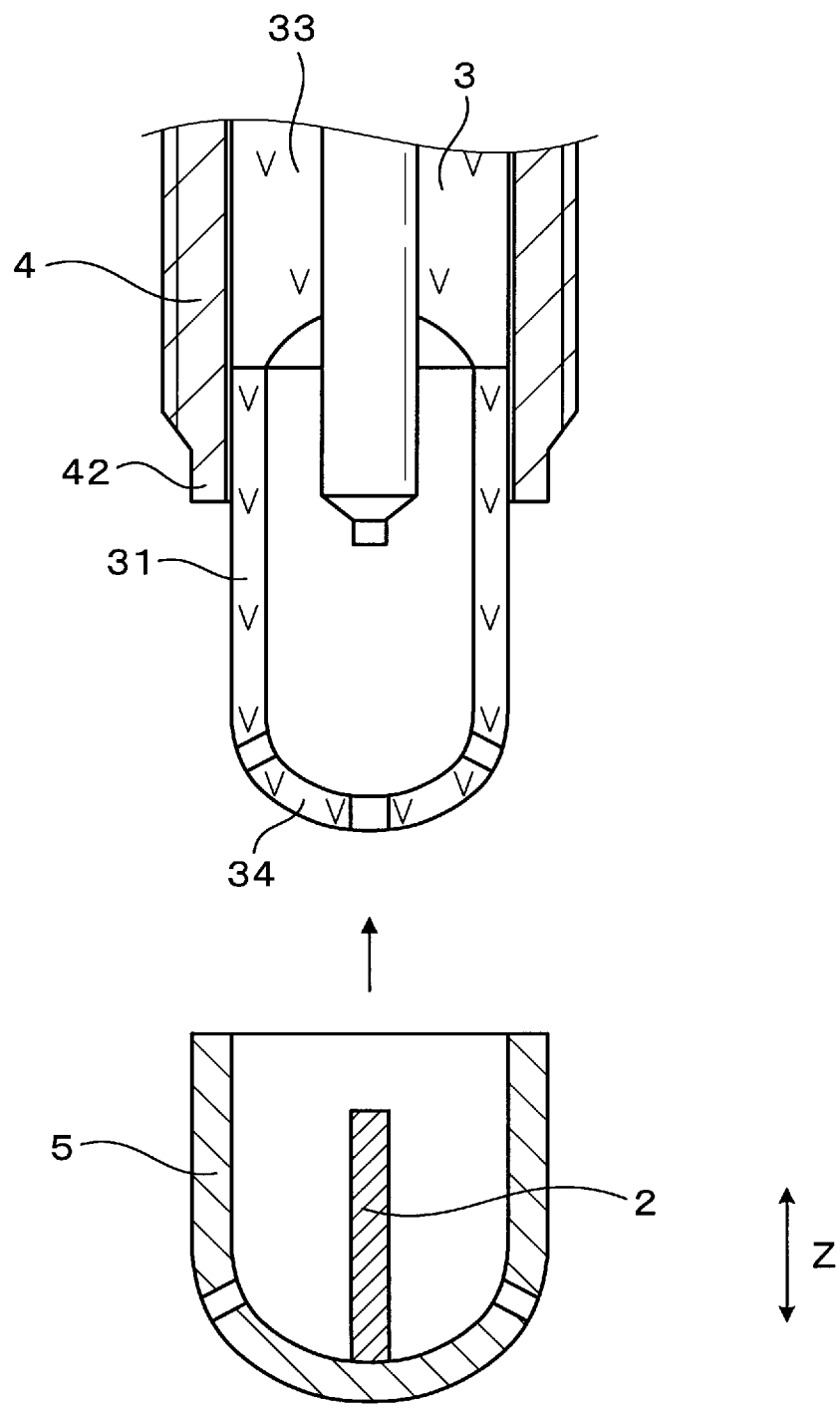
FIG. 5 is a view showing a cross section explaining a step of assembling the housing and the insulator supported by the housing with the plug cover and a ground electrode in the spark plug according to the first exemplary embodiment.

As shown in FIG. 5, the ground electrode 2 is joined to the plug cover 5. The plug cover 5 with the ground electrode 2 is assembled with the spark plug housing 4 with the insulator 3. In this assembling step, the plug cover 5 with the ground electrode 2 is arranged close to an opening direction of the plug cover 5, i.e. the axial direction Z. That is, the insulator front end part 31 of the insulator 3 is inserted into the inside of the plug cover 5, and the ground electrode 2 is inserted into the electrode mounting hole 32 formed in the third part 313 of the insulator front end part 31 of the insulator 3. The opening end part of the plug cover 5 is joined to the housing front end part 42 of the spark plug housing 4.

After this, the method of producing the spark plug 1 according to the first exemplary embodiment is finished. In the step of assembling the insulator cover 34 and the insulator body 33 together, the inner peripheral surface of the spark plug housing 4 is used as a guide with which the spark plug housing 4, the insulator body 33, the insulator cover 34 are assembled together. This makes it possible to suppress misalignment between the spark plug housing 4, the insulator body 33, the insulator cover 34, and to easily assemble them with high accuracy.

Further, the plug cover 5 is open in the assembling direction of the spark plug housing 4 and the plug cover 5, and the ground electrode 2 is formed at the assembling direction. This makes it possible to easily assemble the plug cover 5 with the ground electrode 2, the spark plug housing 4 and the insulator 3 together in the axial direction Z.

A description will now be given of behavior and effects of the spark plug 1 according to the first exemplary embodiment.

In the structure of the spark plug 1 according to the first exemplary embodiment, the insulator 3 has the insulator front end part 31 which projects from the opening part 300 formed at the front end side of the axial hole 30. The insulator front end part 31 of the insulator 3 is formed to cover the auxiliary combustion chamber 12 from the outer radial side of the auxiliary combustion chamber 12. This makes it possible for the insulator front end part 31 of the insulator 3 having low thermal conductivity to cover at least a part of the auxiliary combustion chamber 12 in the front end side of the opening part 300 of the axial hole 30. This structure makes it possible to suppress the flame generated in the auxiliary combustion chamber 12 from being leaked to the member forming the auxiliary combustion chamber 12. That is, this structure makes it possible to improve ignitability by the spark plug 1.

Further, the insulator front end part 31 of the insulator 3 is formed on and to cover the inside surface of the plug cover 5. This structure makes it possible to easily suppress the plug cover 5 from absorbing thermal energy of flame generated in the auxiliary combustion chamber 12 because no flame generated in the auxiliary combustion chamber 12 directly contacts with the plug cover 5. That is, this structure makes it possible to improve ignitability by the spark plug 1.

Further, in the axial direction Z, the insulator front end part 31 of the insulator 3 is formed up to the front end side from the location of the discharge gap G. That is, the insulator front end part 31 of the insulator 3 is formed at the outer radial side of the discharge gap G in the radial direction of the spark plug 1. This structure makes it possible to prevent thermal energy of flame generated in the auxiliary combustion chamber 12 from being quickly leaked to the spark plug housing 4 and the plug cover 5 even if the flame is in contact with the spark plug housing 4 and the plug cover 5 at an early stage during the generation of flame in the auxiliary combustion chamber 12. This structure makes it possible to further improve ignitability by the spark plug 1.

Still further, the insulator front end part 31 of the insulator 3 covers the auxiliary combustion chamber 12 from the front end side there. This makes it possible for the insulator front end part 31 to cover the wider area of the auxiliary combustion chamber 12. It is thereby possible for the structure of the spark plug 1 to prevent thermal energy of flame generated in the auxiliary combustion chamber 12 from being leaked to the spark plug housing 4 and the plug cover 5 during the generation of flame in the auxiliary combustion chamber 12. This structure makes it possible to further improve generation of flame in the auxiliary combustion chamber 12.

The inner peripheral surface 311a is formed outwardly toward the outer radial side of the first part 311 of the insulator front end part 31 along the front end side of the spark plug 1. This makes it possible to easily reduce the surface area of the inner peripheral surface 311a at the distal end side of the insulator front end part 31. That is, this structure makes it possible to prevent thermal energy of flame generated in the auxiliary combustion chamber 12 from being leaked to the insulator front end part 31. It is therefore possible to further improve generation of flame in the auxiliary combustion chamber 12.

As previously described, the first exemplary embodiment of the present disclosure provides the spark plug 1 for internal combustion engines having improved ignitability.

Second Exemplary Embodiment

A description will be given of the spark plug according to a second exemplary embodiment with reference to FIG. 6 to FIG. 9.

The second exemplary embodiment provides the spark plug 1 having a ground electrode 2-1 which is different in structure from the ground electrode 2 in the spark plug 1 according to the first exemplary embodiment.

Figure 6:
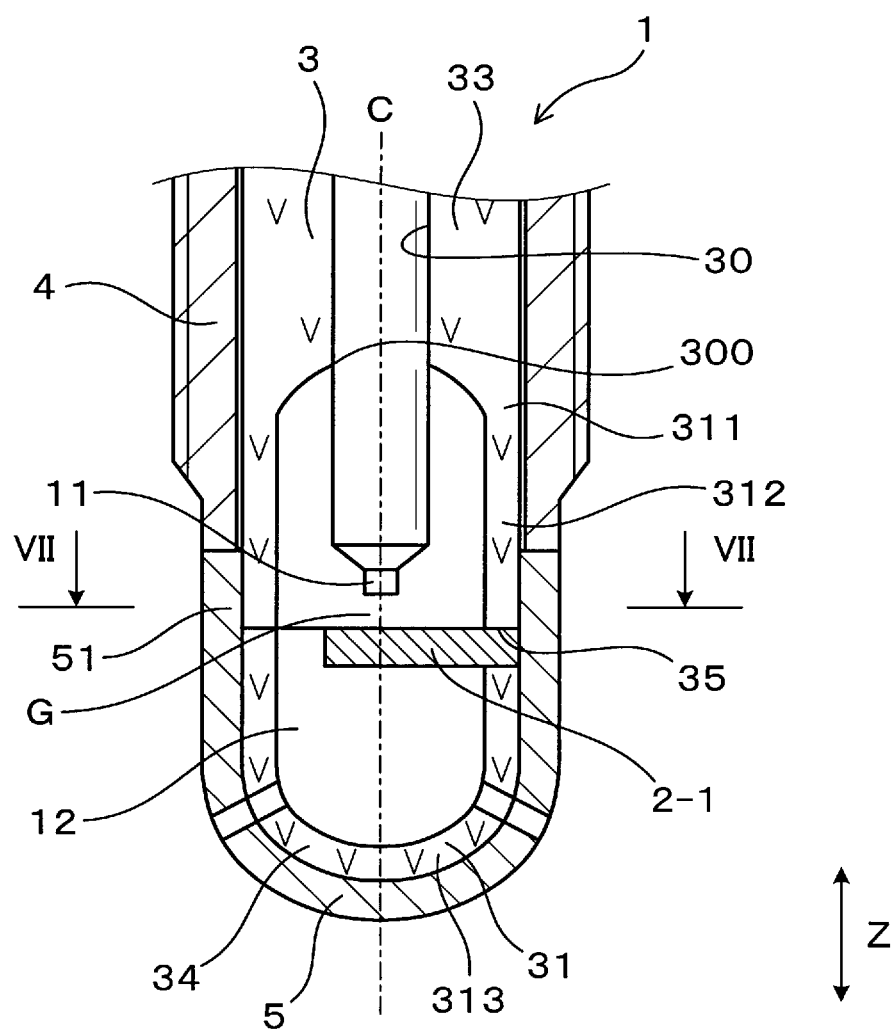
FIG. 6 is a view showing an enlarged cross section around the front end part of the spark plug according to a second exemplary embodiment of the present disclosure.
Figure 7:
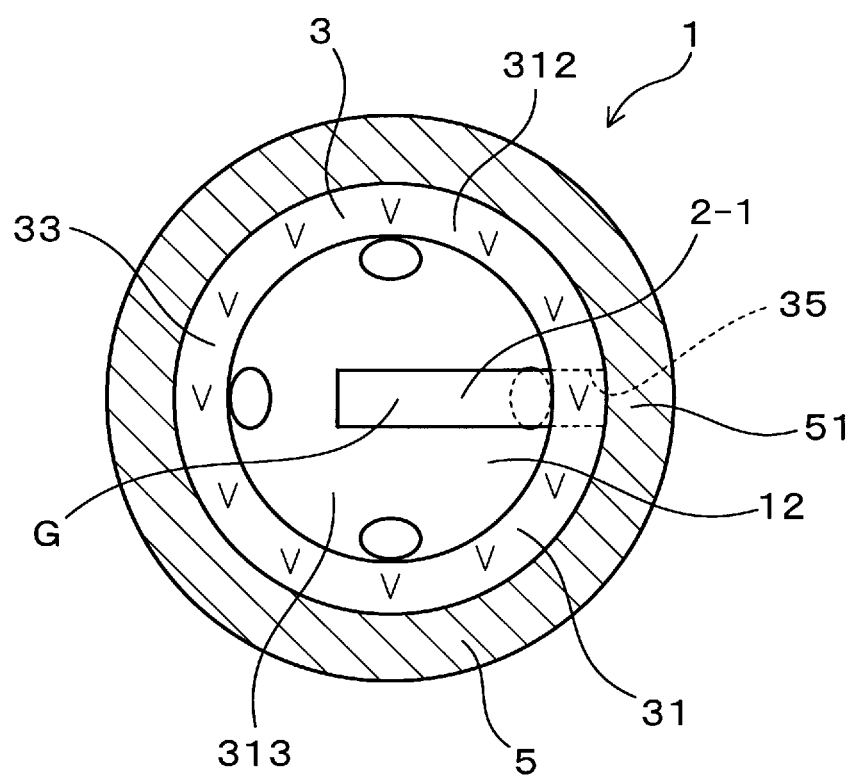
FIG. 7 is a view showing a cross section of the spark plug along the line VII-VII shown in FIG. 6.

FIG. 6 is a view showing an enlarged cross section around the front end part of the spark plug 1 according to the second exemplary embodiment of the present disclosure. FIG. 7 is a view showing a cross section of the spark plug 1 along the line VII-VII shown in FIG. 6.

As shown in FIG. 6 and FIG. 7, the ground electrode 2-1 projects or stands inwardly in the inner diameter side from the cylindrical part 51 of the plug cover 5, i.e. from the insulator cover 34. The ground electrode 2 has a pillar or column shape extending or projecting in the radial direction. In the radial direction, the ground electrode 2-1 is formed from the cylindrical part 51 of the plug cover 5 in the radial direction to a part projecting from the location of the central electrode 11.

As shown in FIG. 6, a part of the ground electrode 2-1 faces the front end part of the central electrode 11 in the axial direction Z through the discharge gap G. The ground electrode 2-1 has a cylindrical shape, similar to the structure of the ground electrode 2 in the spark plug 1 according to the first exemplary embodiment. The concept of the present disclosure is not limited by this structure. For example, it is possible for the ground electrode 2-1 to have a rectangular pillar shape having a flat surface at the distal end side thereof, which faces the central electrode 11 in the axial direction Z of the spark plug 1. This structure reduces wear of the ground electrode 2-1 by repetition of discharge, and prevents progress of abrasion of the ground electrode 2-1.

Figure 8:
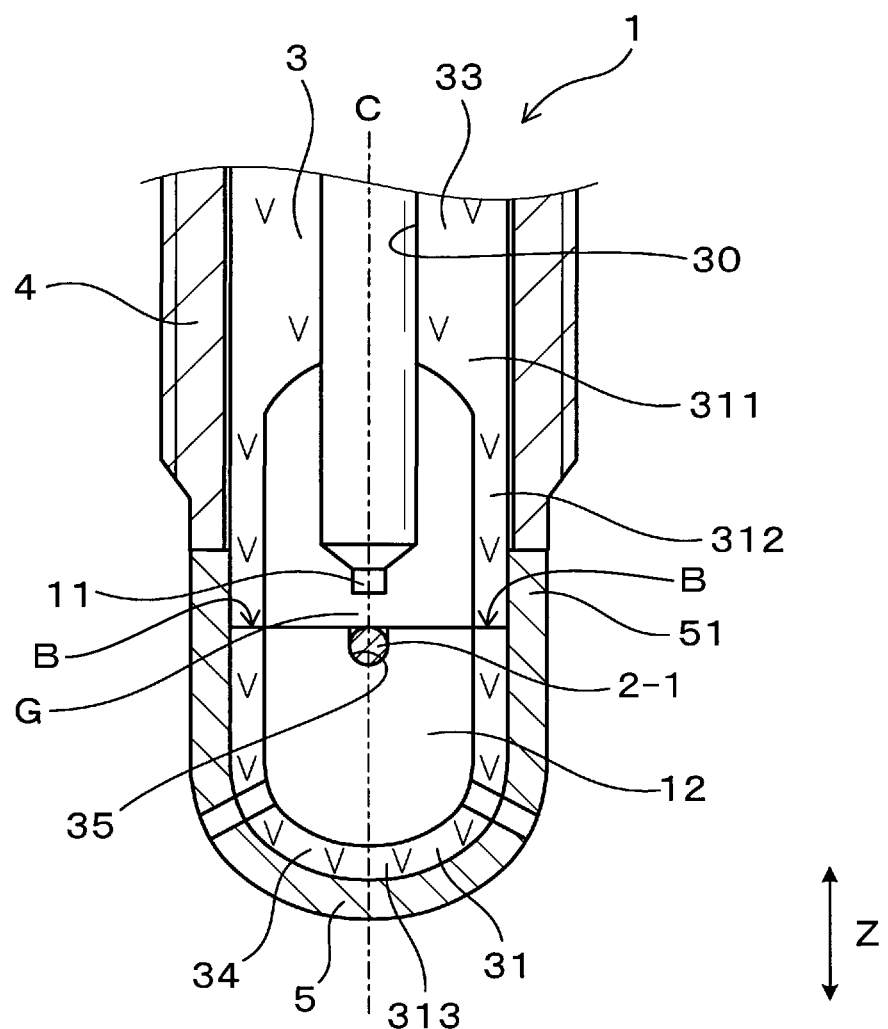
FIG. 8 is a view showing an enlarged cross section of the front end part of the spark plug, which is perpendicular to the ground electrode in the spark plug according to the second exemplary embodiment.
Figure 9:
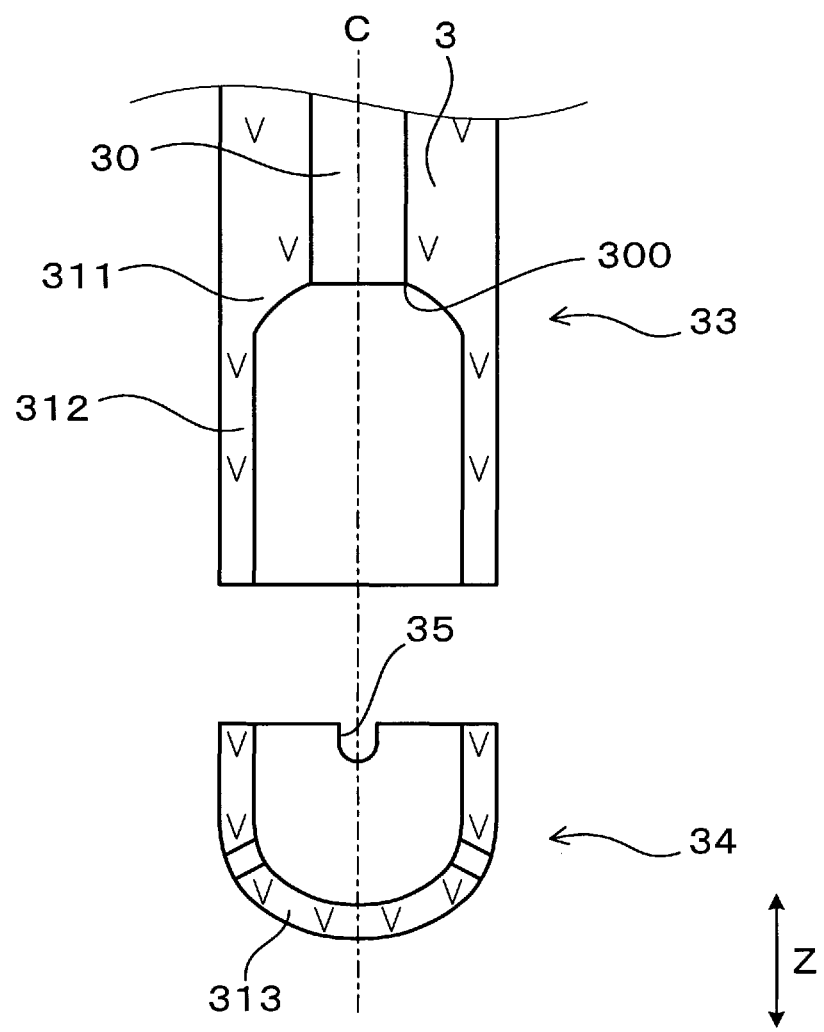
FIG. 9 is a view showing an exploded cross section of the insulator in the spark plug according to the second exemplary embodiment.

FIG. 8 is a view showing an enlarged cross section of the front end part of the spark plug 2-1, which is perpendicular to the ground electrode 11 in the spark plug 1 according to the second exemplary embodiment. FIG. 9 is a view showing an exploded cross section of the insulator 3 in the spark plug 1 according to the second exemplary embodiment.

As shown in FIG. 6 to FIG. 9, a boundary part B between the insulator body 33 of the insulator 3 and the insulator cover 34 is formed at a central part of the second part 312 of the insulator front end part 31 in the axial direction Z of the spark plug. Further, the insulator cover 34 is composed of a part of the second part 312 and the third part 313 of the of the insulator front end part 31. As shown in FIG. 6 and FIG. 8, the boundary part B between the insulator body 33 of the insulator 3 and the insulator cover 34 is formed at the distal end side of the ground electrode 2-1 in the axial direction Z of the spark plug 1.

As shown in FIG. 6, FIG. 8 and FIG. 9, the distal end part of the insulator cover 34

As shown in FIG. 6, FIG. 8 and FIG. 9, the distal end part of the insulator cover 34 has a recess part 35. The recess part 35 is formed at the distal end side in the circumferential direction of the insulator cover 34 so that a part of the distal end side of the insulator cover 34 is recessed toward the front end side of the insulator cover 34.

The ground electrode 2-1 is inserted into and fitted with the recess part 35, and the outer peripheral end part of the ground electrode 2-1 is connected to the plug cover 5.

The recess part 35 of the insulator cover 34 has a bottom part which has a shape to be fitted with the ground electrode 2-1. That is, when the ground electrode 2-1 has a cylindrical shape, the bottom part of the recess part 35 has a rounded shape which is fitted with the cylindrical side surface of the ground electrode 2-1. This structure makes it possible to suppress generation of a gap between the recess part 35 and the cylindrical side surface of the ground electrode 2-1, and to suppress a stress concentrated at the contact area between the recess part 35 and the cylindrical side surface of the ground electrode 2-1. In other words, this structure makes it possible to increase mechanical strength of the insulator cover 34. It is acceptable for the recess part 35 to have another shape, for example to have a rectangular cross section, instead of a circular cross section.

An opening part of the recess part 35, which faces the central electrode 11 side, is closed when the insulator body 33 and the insulator cover 34 are assembled together.

Instead of forming the recess part 35, it is acceptable to form a penetration through hole in the second part 312 of the insulator front end part 31 in the radial direction of the insulator 3, and to insert the ground electrode 2-1 into the penetration through hole.

For example, it is possible to arrange the ground electrode 2-1 into the recess part 35 by inserting the ground electrode 2-1 into the inside of the recess part 35 from the distal end side in the axial direction Z of the insulator cover 34 which has been inserted in the plug cover 35.

Further, when the penetration through hole is used instead of the recess part 35, it is possible to pass the ground electrode 2-1 through the penetration through hole from the outside of the plug cover 5 after the plug cover 5 is assembled to the insulator front end part 31 of the insulator 3.

Other components of the spark plug according to the second exemplary embodiment are the same as those of the spark plug according to the first exemplary embodiment. The explanation of the same components is omitted here for brevity. The same components between the first and second exemplary embodiments are referred to with the same reference numbers and characters.

The spark plug according to the second exemplary embodiment has the same behavior and effects as the spark plug according to the first exemplary embodiment.

The concept of the present invention is not limited by the second exemplary embodiment previously described. For example, it is possible for the second exemplary embodiment to have a first modification and a second modification as follows.

(First Modification)

A description will now be given of a first modification with reference to FIG. 10 and FIG. 11.

Figure 10:
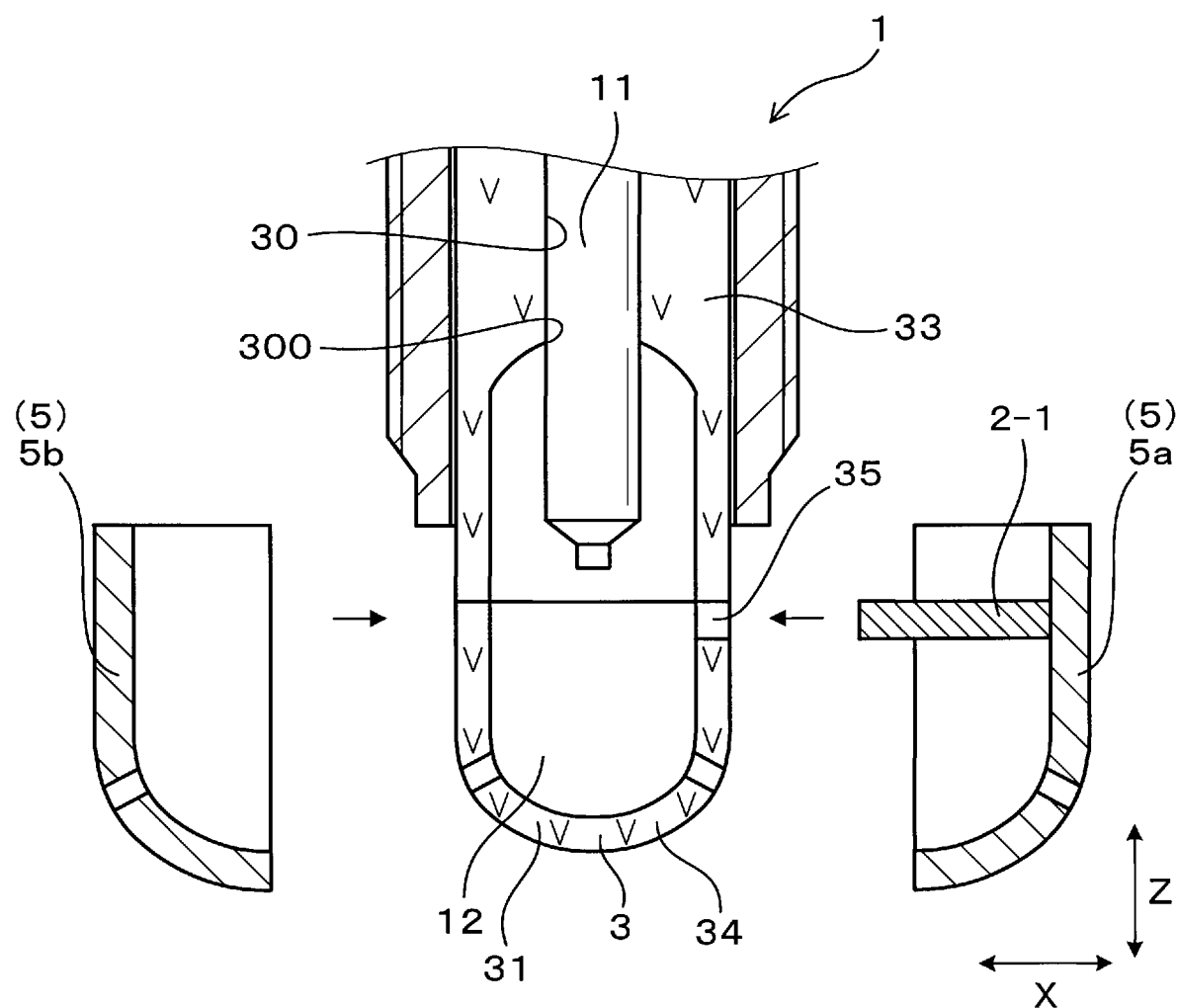
FIG. 10 is a view showing an exploded cross section around the front end part of the spark plug according to a first modification of the second exemplary embodiment.
Figure 11:
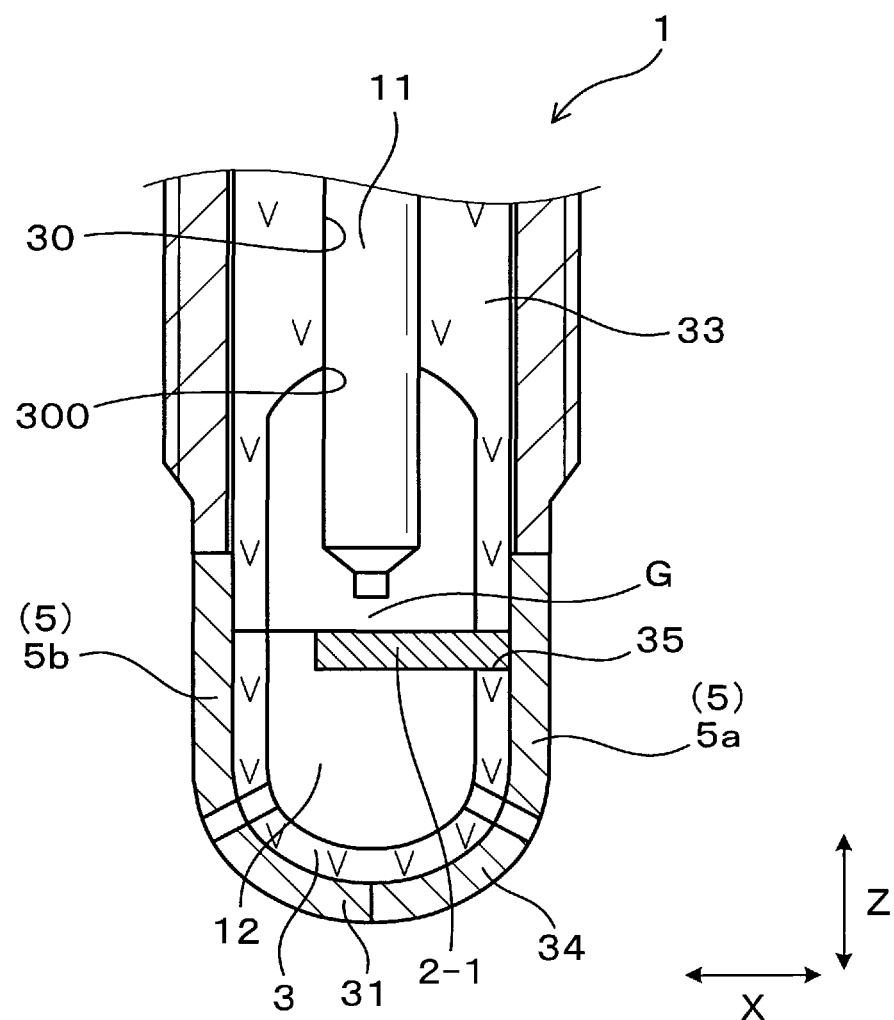
FIG. 11 is a view showing a cross section around the front end part of the spark plug according to the first modification of the second exemplary embodiment.

FIG. 10 is a view showing an exploded cross section around the front end part of the spark plug 1 according to the first modification of the second exemplary embodiment. FIG. 11 is a view showing a cross section around the front end part of the spark plug 1 according to the first modification of the second exemplary embodiment.

As shown in FIG. 10, the spark plug according to the first modification has a structure in which the plug cover 5 is divided to a first plug cover 5a and a second plug cover 5b along a formation direction X of the ground electrode 2-1, to which the ground electrode 2-1 stands.

This structure allows the spark plug to be easily produced. That is, this structure makes it possible to increase the productivity of the spark plug. The first plug cover 5a is connected to the ground electrode 2-1. On producing the spark plug 1, the first plug cover 5a is connected to the ground electrode 2-1. After this, the first plug cover 5a is assembled with the insulator 3 while the ground electrode 2-1 is inserted into the recess part 35. The second plug cover 5b is further assembled with the insulator 3 from the opposite to the first plug cover 5a along the formation direction X of the ground electrode 2-1. Next, the first plug cover 5a and the second plug cover 5b are joined together through the facing surfaces thereof. This makes it possible to easily produce the spark plug 1 according to the first modification of the second exemplary embodiment.
(Second Modification)

A description will now be given of a second modification with reference to FIG. 12 and FIG. 13.

Figure 12:
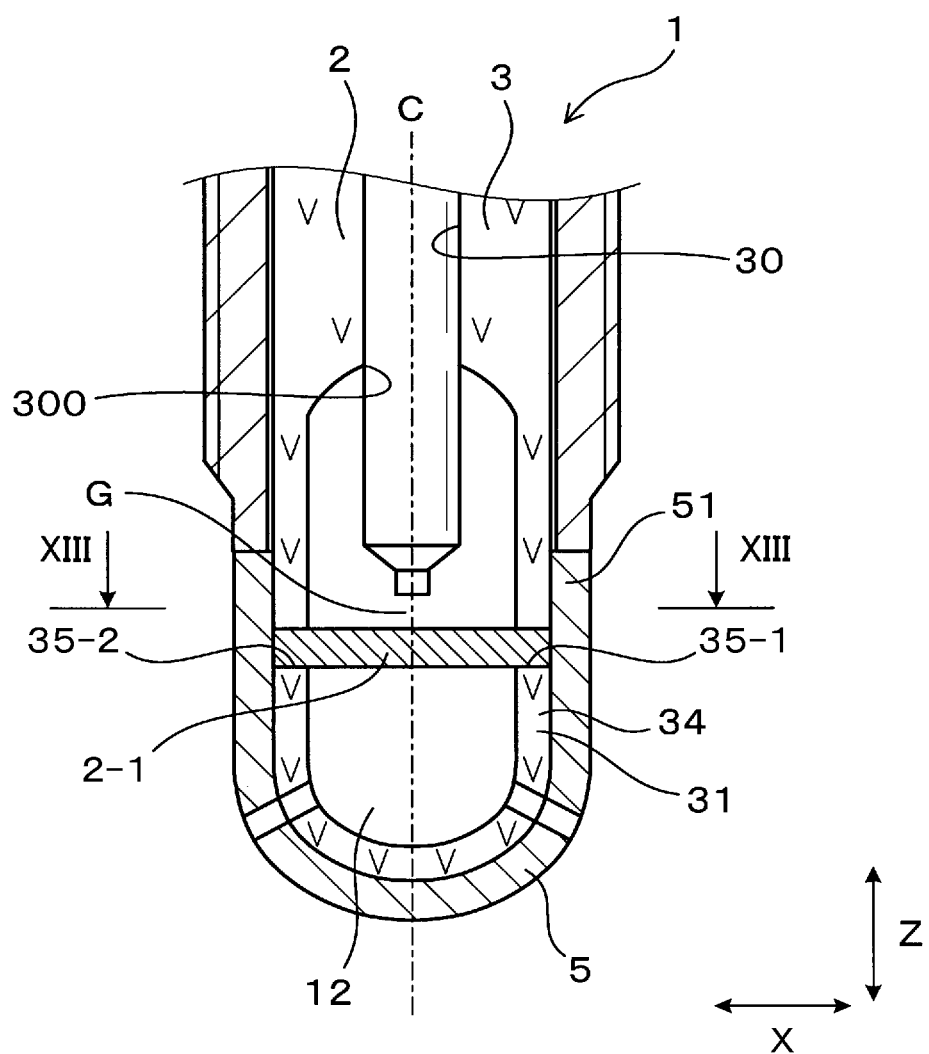
FIG. 12 is a view showing an enlarged cross section around the front end part of the spark plug according to a second modification of the second exemplary embodiment.

FIG. 12 is a view showing an enlarged cross section around the front end part of the spark plug 1 according to the second modification of the second exemplary embodiment. FIG. 13 is a view showing a cross section of the spark plug 1 along the line XIII-XIII shown in FIG. 12.

Figure 13:
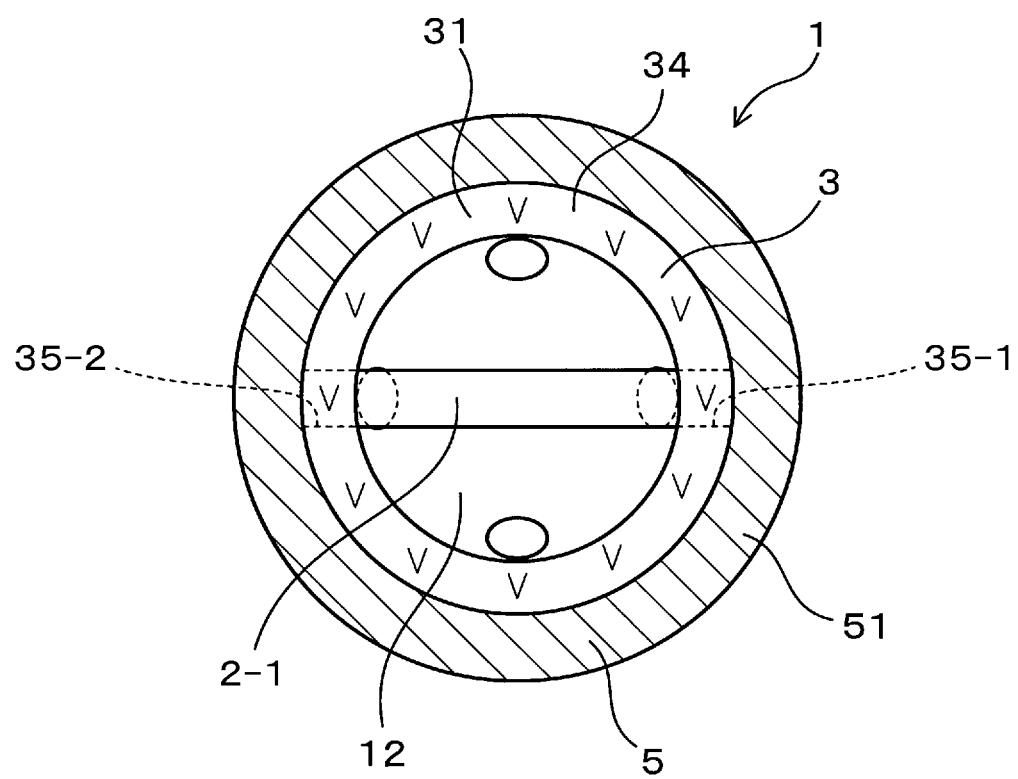
FIG. 13 is a view showing a cross section of the spark plug along the line XIII-XIII shown in FIG. 12.

As shown in FIG. 12 and FIG. 13, the insulator cover 34 has a first recess part 35-1 and a second recess part 35-2 formed at opposition locations in the direction X, for example. The ground electrode 2-1 is arranged in the first recess part 35-1 and the second recess part 35-2. That is, both the end parts of the ground electrode 2-1 are connected to and supported by the cylindrical part 51 of the plug cover 5. This structure makes it possible to increase the mechanical strength of the ground electrode 2-1 in the spark plug.

Third Exemplary Embodiment

A description will be given of the spark plug according to a third exemplary embodiment with reference to FIG. 14 to FIG. 16.

The third exemplary embodiment provides the spark plug 1 having a structure without the plug cover 5 shown in FIG. 6 and FIG. 7.

Figure 14:
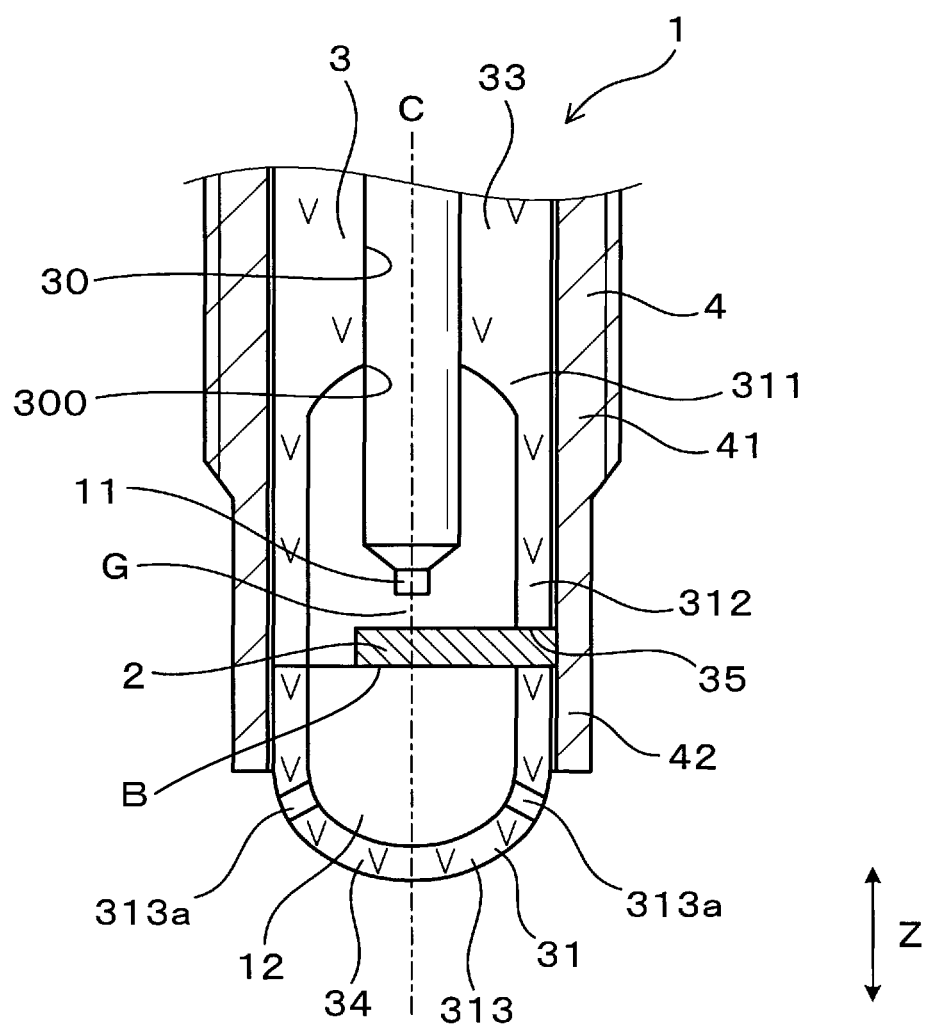
FIG. 14 is a view showing an enlarged cross section around a front end part of the spark plug according to a third exemplary embodiment of the present disclosure.

FIG. 14 is a view showing an enlarged cross section around a front end part of the spark plug 1 according to the third exemplary embodiment. FIG. 15 is a view showing the front end of the spark plug 1 according to the third exemplary embodiment. FIG. 16 is a view showing an exploded cross section of the insulator in the spark plug 1 according to the third exemplary embodiment.

As shown in FIG. 14, in the axial direction Z of the spark plug 1, the housing front end part 42 is formed in the area from the mounting screw part 41 of the spark plug housing 4 to the front end part of the discharge gap G. As shown in FIG. 14 and FIG. 15, the housing front end part 42 has a cylindrical shape. FIG. 15 shows the housing front end part 42 only.

Figure 15:
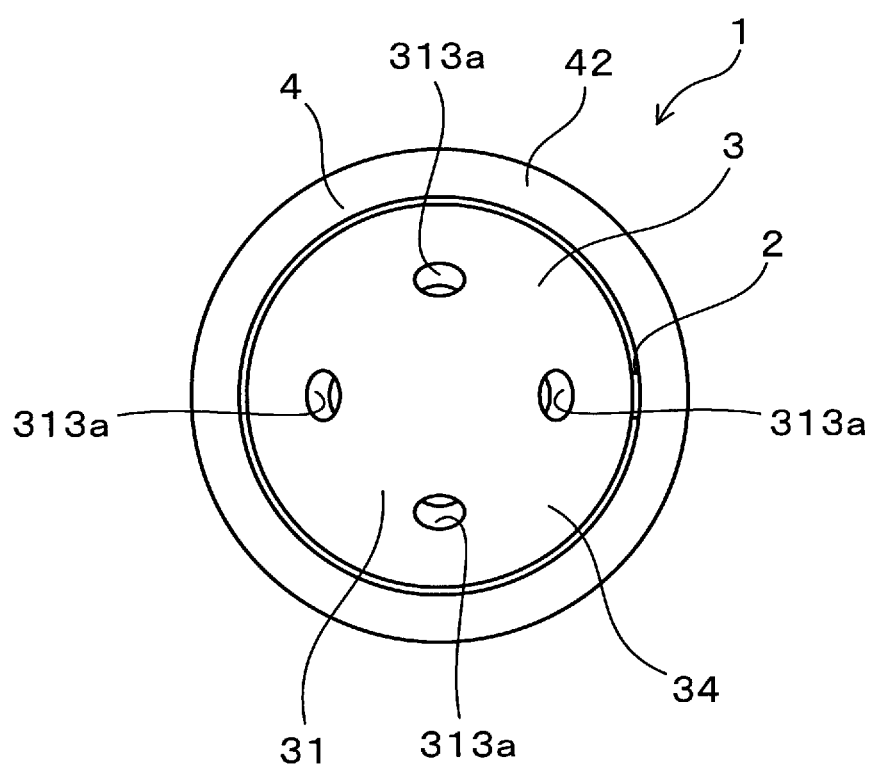
FIG. 15 is a view showing the front end of the spark plug according to the third exemplary embodiment of the present disclosure.

As shown in FIG. 14 and FIG. 15, the housing front end part 42 is formed along the outer peripheral surface of the insulator front end part 31 of the insulator 3. The front end part of the housing front end part 42 is open. The third part 313 of the insulator front end part 31 projects from the housing front end part 42 toward the front end side of the spark plug 1.

As shown in FIG. 14, a boundary part B between the insulator body 33 of the insulator 3 and the insulator cover 34 is formed at the front end part in the axial direction Z of the spark plug 1.

Figure 16:
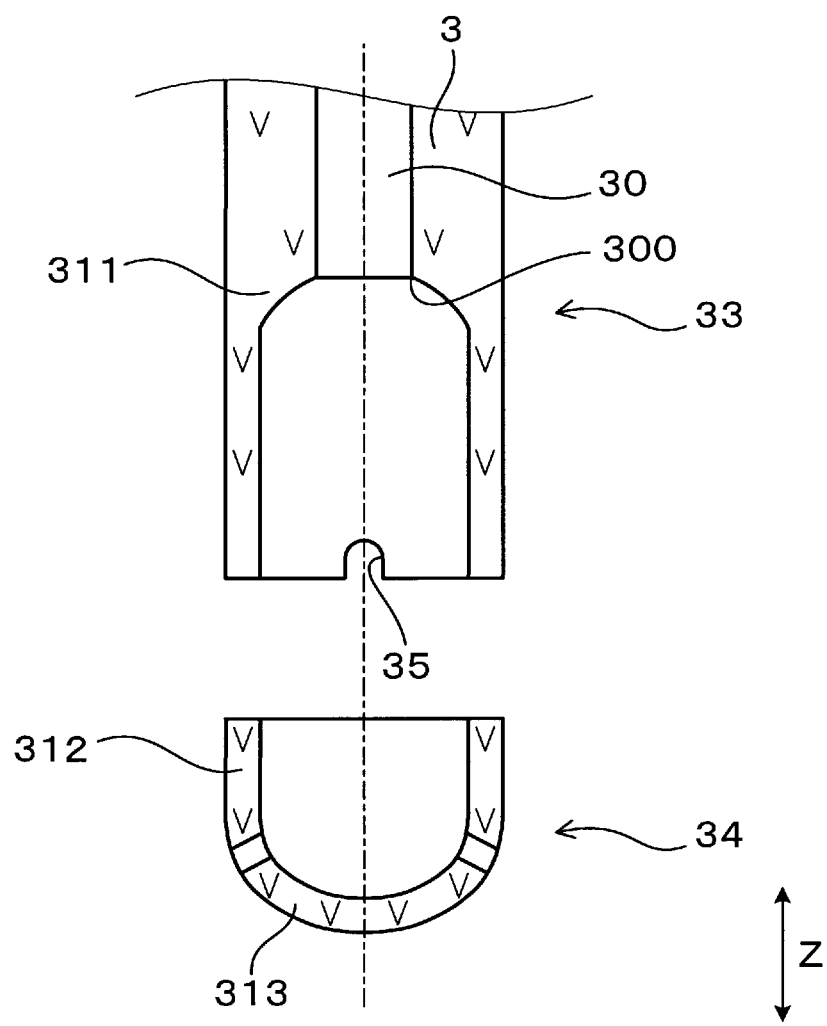
FIG. 16 is a view showing an exploded cross section of the insulator in the spark plug according to the third exemplary embodiment.

As shown in FIG. 14 and FIG. 16, the recess part 25 is formed in the front end part of the insulator body 33. The recess part 35 is formed so that a part in the circumferential direction of the front end surface of the insulator body 33 is recessed toward the distal end side of the insulator body 33.

The ground electrode 2-1 is inserted into and supported by the recess part 35, and an outer peripheral end part of the ground electrode 2-1 is connected to the plug cover 5. The recess part 35 is closed by assembling the insulator body 33 with the insulator cover 34.

For example, it is possible to arrange the ground electrode 2-1 inside the recess part 35 by inserting the ground electrode 2-1 into the recess part 35 from the front end side in the axial direction Z of the insulator body 33 supported by the spark plug housing 4.

The other behavior and effects of the spark plug according to the third exemplary embodiment are the same as those of the spark plug according to the second exemplary embodiment.

It is possible to modify the structure of the spark plug according to the third exemplary embodiment on the basis of the second modification shown in FIG. 12 and FIG. 13 previously described.

Because the spark plug according to the third exemplary embodiment has no plug cover 5, this makes it possible to reduce the total number of components in the spark plug and to reduce the total number of production steps and a manufacturing cost of the spark plug.

In the axial direction Z of the spark plug 1, the housing front end part 42 is formed in the area from the mounting screw part 41 of the spark plug housing 4 to the front end part of the discharge gap G. As shown in FIG. 14, FIG. 15 and FIG. 16, the housing front end part 42 is formed along the outer peripheral surface of the insulator front end part 31 of the insulator 3. Because the insulator front end part 31 is supported by the housing front end part 42, this structure makes it possible to improve the durability of the insulator front end part 31 of the insulator 3. Other behavior and effects of the spark plug according to the third exemplary embodiment are the same as those of the spark plug according to the second exemplary embodiment.

Fourth Exemplary Embodiment

A description will be given of the spark plug according to a fourth exemplary embodiment with reference to FIG. 17.

Figure 17:
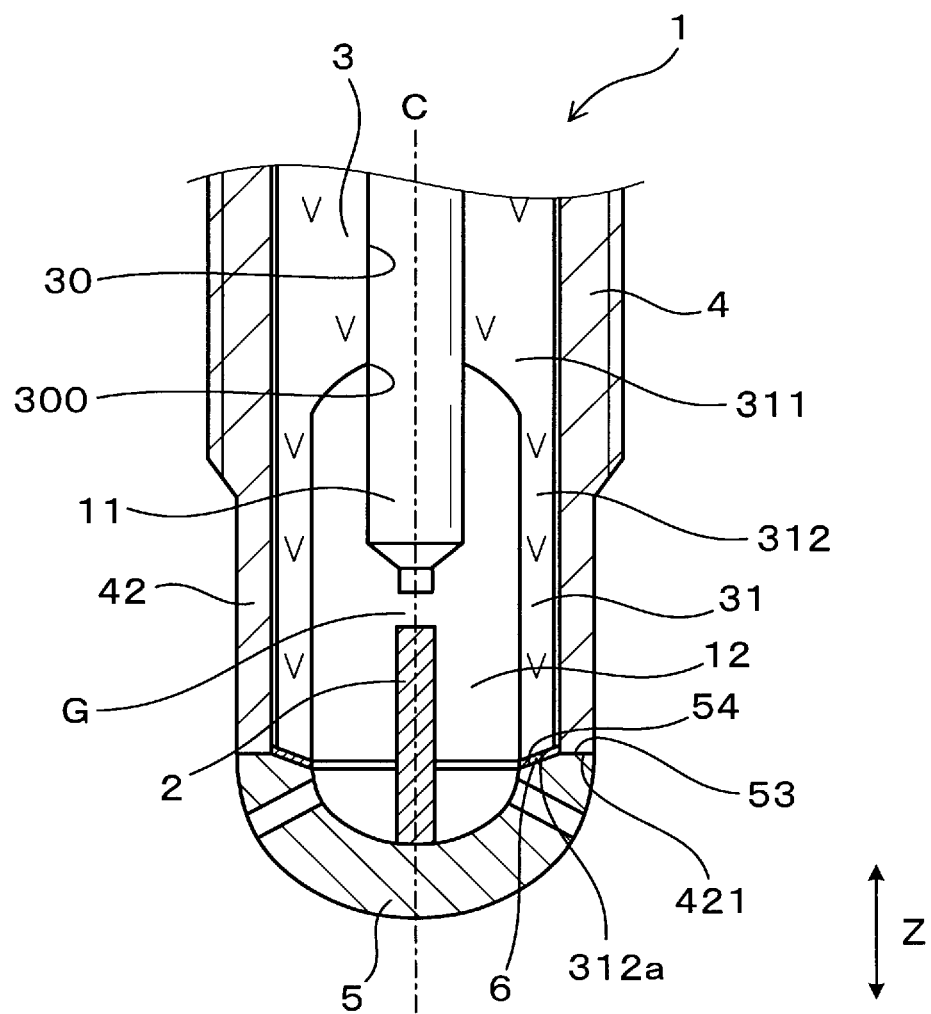
FIG. 17 is a view showing an enlarged cross section around a front end part of the spark plug according to a fourth exemplary embodiment of the present disclosure.

FIG. 17 is a view showing an enlarged cross section around a front end part of the spark plug 1 according to the fourth exemplary embodiment. As shown in FIG. 17, the spark plug 1 according to the fourth exemplary embodiment has the plug cover 5-1 which is different in structure from the plug cover 5 in the spark plug 1 according to the first exemplary embodiment.

In the structure of the spark plug 1 according to the fourth exemplary embodiment shown in FIG. 17, the front end side of the insulator front end part 31 of the insulator 3 is open. The insulator front end part 31 of the insulator 3 has the first part 311 and the second part 312, but does not have the third part 313. On the other hand, the insulator front end part 31 of the insulator 3 has the first part 311, the second part 312 and the third part 313 in the spark plug according to the first exemplary embodiment previously explained.

In the structure of the spark plug 1 according to the fourth exemplary embodiment shown in FIG. 17, the front end part of the insulator front end part 31 is formed up to the area in front of the discharge gap G in the axial direction Z of the spark plug 1.

The front end part of the insulator front end part 31, i.e. the front end part of the second part 312 has a slope surface 312a which is inwardly sloped toward the axial direction Z. The insulator 3 is made of a single member which is not an assembled member composed of a plurality of members.

The housing front end part 42 of the spark plug housing 4 has a cylindrical shape formed along the outer peripheral surface of the insulator front end part 31 of the insulator 3. In the axial direction Z, the front end of the housing front end part 42 and the front end part of the insulator front end part 31 of the insulator 3 are aligned together. A front end surface 421 of the housing front end part 42 has a ring shape formed on a surface which is perpendicular to the axial direction Z.

The plug cover 5 covers the front end surface 421 of the housing front end part 42 and the slope surface 312a of the insulator front end part 31 of the insulator 3. In the structure of the spark plug according to the fourth exemplary embodiment, the auxiliary combustion chamber 12 is formed by the insulator front end part 31 of the insulator 3 and the plug cover 5.

The plug cover 5 has a hemispherical shape extending or protruding toward the front end side thereof in the axial direction Z of the spark plug 1. The distal end surface of the plug cover 5 has a first distal end surface 53 and a second distal end surface 54. The first distal end surface 53 is arranged facing the front end surface 421 of the housing front end part 42. The second distal end surface 54 is arranged facing the slope surface 312a of the insulator front end part 31 of the insulator 3.

The first distal end surface 53 is arranged parallel to the front end surface 421 of the housing front end part 42. The second distal end surface 54 is arranged parallel to the slope surface 312a of the insulator front end part 31 of the insulator 3. The first distal end surface 53 is joined to the front end surface 421 of the housing front end part 42.

The second distal end surface 54 is arranged in contact with the slope surface 312a of the insulator front end part 31 through a thermal transfer member 6. This structure allows the second distal end surface 54 to be thermally in contact with the spark plug housing 6 through the thermal transfer member 6.

Similar to the structure of the spark plug 1 according to the first exemplary embodiment, it is possible to use the spark plug housing 4 and the plug cover 5 made of an electrically conductive material having thermal conductivity such as iron, nickel, nickel iron alloy, stainless, etc.

The thermal transfer member 6 has a thermal conductivity which is more than the thermal conductivity of the spark plug housing 4 and the plug cover 5. For example, the thermal transfer member 6 is made of copper.

The thermal transfer member 6 is closely attached to the overall circumferential surface of the slope surface 312a of the insulator front end part 31 of the insulator 3 and the overall circumferential surface of the second distal end surface 54 of the plug cover 5.

The insulator front end part 31 of the insulator 3 is thermally in contact with the spark plug housing 4 through the thermal transfer member 6 and the plug cover 5. Other components of the spark plug 1 according to the fourth exemplary embodiment are the same as those of the spark plug according to the first exemplary embodiment.

In the structure of the spark plug 1 according to the fourth exemplary embodiment shown in FIG. 17, the insulator front end part 31 of the insulator 3 is thermally in contact with the spark plug housing 4 through the thermal transfer member 6 having a high thermal conductivity which is higher than the thermal conductivity of the spark plug housing 4 and the plug cover 5, that is, which is more than the thermal conductivity of the spark plug housing 4 and the plug cover 5.

This structure makes it possible to promote thermal transfer from the insulator front end part 31 of the insulator 3 to the spark plug housing 4. For example, this structure makes it possible to prevent occurrence of pre-ignition when the auxiliary combustion chamber 12 becomes at a high temperature even if an internal combustion engine is operating at a high load, etc.

The other behavior and effects of the spark plug 1 according to the fourth exemplary embodiment are the same as those of the spark plug according to the first exemplary embodiment.

The concept of the present disclosure is not limited by the disclosure of the first to fourth exemplary embodiments previously described. For example, it is possible for the spark plug to have various modifications within the scope of the present disclosure.

For example, in the structure of the spark plug according to the first to third exemplary embodiments, it is possible to change the location of the boundary part between the insulator body 33 of the insulator 3 and the insulator cover 34. It is also acceptable to form a plurality of boundary parts in the axial direction Z between the insulator body 33 of the insulator 3 and the insulator cover 34.

In the structure of the spark plug according to the first to third exemplary embodiments, the insulator 3 is composed of a plurality of members (i.e. composed of the insulator body 33 and the insulator cover 34). However, the concept of the present disclosure is not limited by this structure. For example, it is possible to use the insulator 3 made of a single material. In the structure of the spark plug according to the fourth exemplary embodiment, the insulator front end part 31 of the insulator 3 is composed of a single member. However, it is acceptable for the insulator 3 to have the insulator front end part 31 composed of a plurality of parts divided in the axial direction Z of the spark plug 1.

In the structure of the spark plug according to the fourth exemplary embodiment, the thermal transfer member 6 is arranged between the insulator front end part 31 of the insulator 3 and the plug cover 5. However, the concept of the present disclosure is not limited by this structure. For example, it is possible to arrange the thermal transfer member 6 in the radial direction of the spark plug between the insulator front end part 31 of the insulator 3 and the spark plug housing 4.

In the structure of the spark plug according to each of the first to fourth exemplary embodiments, it is acceptable to use the insulator front end part 31 composed of a plurality of parts arranged in the axial direction Z of the spark plug, and to assemble the plurality of parts of the insulator front end part 31 together.

In the structure of the spark plug according to each of the first to fourth exemplary embodiments, the insulator front end part 31 of the insulator 3 covers the overall outer peripheral area of the auxiliary combustion chamber 12. However, the concept of the present disclosure is not limited by this structure. For example, it is possible for the insulator front end part 31 to cover a part of the outer peripheral area of the auxiliary combustion chamber 12 at a part of the outer circumferential direction when the auxiliary combustion chamber 12 is formed at the spark plug housing 4 and the plug cover 5.

As previously described in detail, the spark plug according to the present disclosure has the improved structure. That is, the insulator has the insulator front end part. The insulator front end part projects from the opening part formed at the front end side of the axial hole. The insulator front end part of the insulator is formed to cover the auxiliary combustion chamber from the outer radial side of the auxiliary combustion chamber. This structure makes it possible for the insulator front end part of the insulator having low thermal conductivity to cover at least a part of the auxiliary combustion chamber in the front end side of the opening part of the axial hole. This structure makes it possible to suppress the flame generated in the auxiliary combustion chamber from being leaked to the member forming the auxiliary combustion chamber. That is, this structure makes it possible to easily improve ignitability by the spark plug. As previously described in detail, the present disclosure provides the spark plug having improved ignitability.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A spark plug for internal combustion engines, wherein the spark plug has a central axis along which an axial direction is provided and around which a circumferential direction is provided, and is provided with a front end in the axial direction, the spark plug comprising:
   a central electrode;
   a ground electrode, wherein a discharge gap is formed between the central electrode and the ground electrode in an auxiliary combustion chamber;
   an insulator having a cylindrical shape comprising an axial hole and an insulator front part, the axial hole being formed through the insulator in the axial direction, and the central electrode being arranged and supported in the axial hole; and
   the insulator front part i) providing the auxiliary combustion chamber therein, ii) being configured to surround the auxiliary combustion chamber in a whole periphery thereof in the circumferential direction, and iii) projecting further towards the front end than the discharge gap is in the axial direction, the front end being located in a combustion chamber of an internal combustion engine.

2. The spark plug according to claim 1, further comprising:
   a spark plug housing having a cylindrical shape in which the insulator is supported and a front end part; and
   a plug cover fixed to the front end part of the spark plug housing and configured with an inner surface, the plug cover being configured to form the auxiliary combustion chamber,
   wherein the insulator front part is formed to cover the inner surface of the plug cover.

3. The spark plug according to claim 2, wherein
   the insulator front part is configured to cover, from the front end, the auxiliary combustion chamber.

4. The spark plug according to claim 3, wherein
   the insulator front part has an inner peripheral surface extending radially toward an outer radial side and away from the central axis, as the insulator front part extends towards the front end in the axial direction.

5. The spark plug according to claim 2, wherein
   the insulator front part is thermally in contact with the spark plug housing through a thermal transfer member having thermal conductivity which is higher than thermal conductivity of the spark plug housing.

6. The spark plug according to claim 2, wherein
   the insulator front part has an inner peripheral surface formed further towards an outer radial side and away from the central axis, as the insulator front part extends towards the front end in the axial direction.

7. The spark plug according to claim 1, wherein
   the insulator front part is configured to cover, from the front end, the auxiliary combustion chamber.

8. The spark plug according to claim 7, further comprising:
   a spark plug housing having a cylindrical shape in which the insulator is supported, wherein
   the insulator front part is thermally in contact with the spark plug housing through a thermal transfer member having thermal conductivity which is higher than thermal conductivity of the spark plug housing.

9. The spark plug according to claim 7, wherein
   the insulator front part has an inner peripheral surface formed further towards an outer radial side and away from the central axis, as the insulator front part extends towards the front end in the axial direction.

10. The spark plug according to claim 1, further comprising;
    a spark plug housing having a cylindrical shape in which the insulator is supported, wherein
    the insulator front part is thermally in contact with the spark plug housing through a thermal transfer member having thermal conductivity which is higher than thermal conductivity of the spark plug housing.

11. The spark plug according to claim 1, wherein
    the insulator front part has an inner peripheral surface formed further towards an outer radial side and away from the central axis, as the insulator front part extends towards the front end in the axial direction.

12. The spark plug according to claim 11, further comprising;
    a spark plug housing having a cylindrical shape in which the insulator is supported, wherein
    the insulator front part is thermally in contact with the spark plug housing through a thermal transfer member having thermal conductivity which is higher than thermal conductivity of the spark plug housing.

13. The spark plug according to claim 1, wherein:
    the insulator front part is projected toward the front end and is closed at the front end so as to form a front end portion at the front end; and
    the front end portion is provided with a mounting hole through which the ground electrode is built into the auxiliary combustion chamber and an insulator injection hole communicating between the auxiliary combustion chamber of the spark plug and the combustion chamber of the internal combustion engine.

* * * * *